(12) United States Patent
Doane

(10) Patent No.: US 8,973,921 B2
(45) Date of Patent: Mar. 10, 2015

(54) HIGH TEMPERATURE/HIGH PRESSURE SEAL

(75) Inventor: James C. Doane, Friendswood, TX (US)

(73) Assignee: Baker Hughes Incorporated, Houston, TX (US)

(*) Notice: Subject to any disclaimer, the term of this patent is extended or adjusted under 35 U.S.C. 154(b) by 1063 days.

(21) Appl. No.: 12/720,391

(22) Filed: Mar. 9, 2010

(65) Prior Publication Data

US 2011/0221138 A1    Sep. 15, 2011

(51) Int. Cl.
*E21B 33/03*    (2006.01)
*F16J 15/02*    (2006.01)

(52) U.S. Cl.
CPC .................... *F16J 15/025* (2013.01)
USPC ........... 277/329; 277/330; 277/641; 277/630; 277/637; 277/644; 166/182

(58) Field of Classification Search
USPC .......... 277/630, 637, 641, 644; 166/182, 191, 166/196, 387
See application file for complete search history.

(56) References Cited

U.S. PATENT DOCUMENTS

| | | | | |
|---|---|---|---|---|
| RE24,332 | E * | 6/1957 | Svenson | 277/566 |
| 3,575,431 | A * | 4/1971 | Bryant | 277/641 |
| 3,653,670 | A * | 4/1972 | Sifri et al. | 277/438 |
| 3,851,888 | A * | 12/1974 | Limpson et al. | 277/436 |
| 4,040,636 | A | 8/1977 | Albertson et al. | |
| 4,113,268 | A * | 9/1978 | Simmons et al. | 277/641 |
| 4,193,606 | A * | 3/1980 | Iverson | 277/556 |
| 4,328,972 | A * | 5/1982 | Albertson et al. | 277/309 |
| 4,687,212 | A | 8/1987 | Timpson et al. | |
| 4,699,293 | A * | 10/1987 | Duchrow | 220/378 |
| 5,511,518 | A * | 4/1996 | Jain et al. | 123/90.37 |
| 5,551,703 | A | 9/1996 | Morvant | |
| 6,189,894 | B1 * | 2/2001 | Wheeler | 277/549 |
| 6,224,066 | B1 * | 5/2001 | Oetiker | 277/634 |
| 6,267,383 | B1 * | 7/2001 | Morvant | 277/439 |
| 6,494,466 | B1 * | 12/2002 | Hartman et al. | 277/641 |
| 6,523,833 | B1 * | 2/2003 | Ishigaki et al. | 277/650 |
| 6,705,615 | B2 * | 3/2004 | Milberger et al. | 277/328 |
| 6,769,699 | B2 * | 8/2004 | Seki et al. | 277/628 |
| 6,883,804 | B2 | 4/2005 | Cobb | |
| 6,910,692 | B2 * | 6/2005 | Malone et al. | 277/556 |
| 6,962,348 | B2 * | 11/2005 | Fink | 277/608 |

(Continued)

FOREIGN PATENT DOCUMENTS

| CN | 1609482 A | 4/2005 |
|---|---|---|
| CN | 101542170 A | 9/2009 |

OTHER PUBLICATIONS

International Search Report and Written Opinion, International Application No. PCT/US2011/027025, Date of Mailing Nov. 24, 2011, Korean INtellectual Property Office, International Search Report 5 pages; Written Opinion 4 pages.

(Continued)

*Primary Examiner* — Kristina Fulton
*Assistant Examiner* — Eugene G Byrd
(74) *Attorney, Agent, or Firm* — Cantor Colburn LLP

(57) ABSTRACT

A sealing member including a body having a recess; one or more backups extending from the body and tapering over a length thereof; and a sealing element disposed in the recess, the element including one or more steps, each step being adjacent one of the one or more backups and on a surface of the sealing element intended to make contact with a target sealing surface.

12 Claims, 1 Drawing Sheet

(56) References Cited

U.S. PATENT DOCUMENTS

| | | | |
|---|---|---|---|
| 7,604,243 B2 * | 10/2009 | Zitting et al. | 277/584 |
| 7,857,323 B1 * | 12/2010 | Berkes et al. | 277/567 |
| 8,181,972 B2 * | 5/2012 | Tsuji | 277/644 |
| 2010/0084827 A1 * | 4/2010 | Peddle | 277/644 |
| 2010/0140881 A1 | 6/2010 | Matsuo | |
| 2010/0264606 A1 * | 10/2010 | Hayashi | 277/641 |

OTHER PUBLICATIONS

Baker Hughes Incorporated, "INLine Liner Hanger Packer System" Best in Class; Baker Oil Tools; Pub. No. BOT-06-9857; Houston, Texas; Mar. 2006; pp. 1-4.

Baker Hughes Incoporated, "Premier Revocable Production Packer" Best in Class; Baker Oil Tools; Pub. No. 20002835; Houston, Texas; Apr. 2001; pp. 1-6.

Alan Humphreys, Total France and Robert Ross, Baker Oil Tools, Overcoming the Loss of a Primary Barrier in an HP/HT Well-Investigation and Solution; SPE/IADC 105736; presentation at the 2007 SPE/IADC Drilling Conference; Amsterdam, The Netherlands, Feb. 20-22, 2007; pp. 1-10.

Chinese Office Action for CN Application No. 201180012780.6, dated May 4, 2014, pp. 1-15.

\* cited by examiner

HIGH TEMPERATURE/HIGH PRESSURE SEAL

BACKGROUND

In the drilling and completion arts, sealing of various components and or spaces is important. Sealing annular spaces is quite common and can significantly affect borehole activity or efficiency. There are many and varied types of seals that have been used successfully over the years in many borehole but there is a particular difficulty with respect to high temperature/high pressure applications. Such applications are becoming more common in connection with the use and exploitation of deeper boreholes for such as Carbon Dioxide sequestration, geothermal activities and Petroleum production, for example.

High temperature environments tend to degrade sealing materials and high pressure is difficult for obvious reasons. Nevertheless, with increasing depths and a relentless pursuit of subterranean business opportunities, the art is always receptive to improvements in sealing technology.

SUMMARY

A sealing member including a body having a recess; one or more backups extending from the body and tapering over a length thereof; and a sealing element disposed in the recess, the element including one or more steps, each step being adjacent one of the one or more backups and on a surface of the sealing element intended to make contact with a target sealing surface.

BRIEF DESCRIPTION OF DRAWINGS

Referring now to the drawings wherein like elements are numbered alike in the several Figures.

DETAILED DESCRIPTION

It is known in the art to urge a member radially outwardly to create a seal with a radially outwardly positioned tubular member. Configurations capable of creating this type of seal are also known to the art. For this reason it is needless to describe such components but rather to focus upon a sealing member portion of a sealing configuration that exemplifies the invention.

Figure 1:
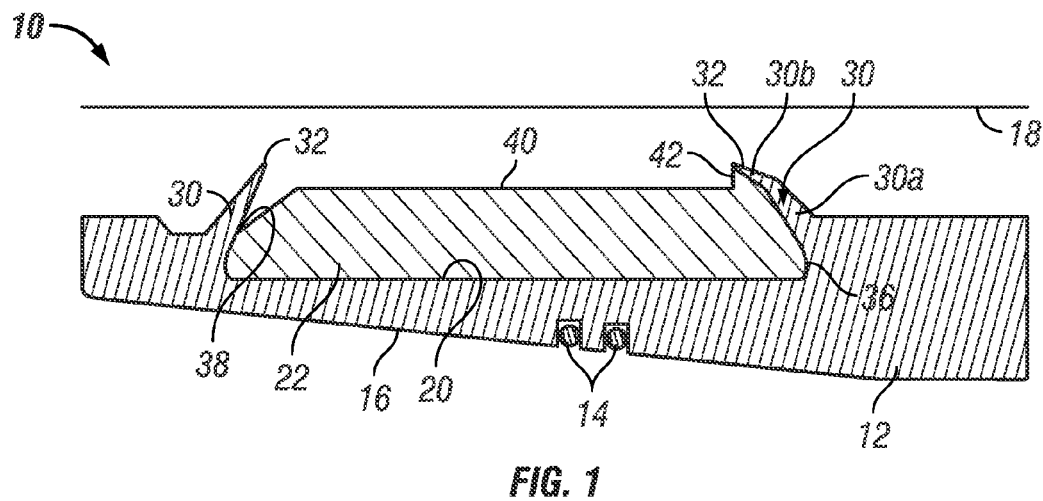
FIG. 1 is a cross sectional representation of a portion of a sealing configuration.

Referring to FIG. 1, a first embodiment of a sealing member 10 is illustrated. The member includes a body 12 endowed with one or more seals 14 that will prevent fluid and or pressure migration radially inwardly of the body. As one of skill in the art will recognize, the body includes a tapered surface 16 and hence is configured to ride on a frustoconical member (not shown but a known configuration in the art) to thereby urge the body radially outwardly and into contact with a target surface 18 to be sealed against. The body is composed of one or more materials having good elongation properties such as AISI 8620 annealed metal material. Other materials having similar properties including Polyetheretherketone can also be used.

The target surface 18 in one embodiment is a casing inside surface. Important to note is that the surface 18 may be not only a smooth easy to seal surface but also may be in for example as-rolled casing having inside dimensional deviations up to about 0.1 inch. Structural aspects of the invention responsible for this benefit are discussed hereunder.

The body 12 includes a seal element recess 20 sized and configured to receive a seal element 22. At either longitudinal end of the recess 20 is a backup 30 extending from the body 12. Upon brief perusal of FIG. 1, it will be evident that the backups 30 are unusual. Backups 30 extend for a relatively long distance from the body 12 and taper during that extension. In one embodiment, at least one of the backups 30 embodies two angles over its length, which are identified by 30a and 30b. The change in the angle of the backups 30 provides for increasing the length of the backups to allow for longer engagement with surface 18 without exceeding a drift diameter of the seal member and falls within a range of 5 to 25 degrees. The backups, because of the length of their extension and the continued taper along that extension are quite narrow at terminal ends 32 thereof. The taper employed is selected to ensure that the backups will substantially conform to deviations in the surface 18. In order to accommodate this result, the taper is in the range of 5 to 15 degrees.

The configuration of the backups 30, as described, is beneficial in two ways. First, the longer length of the backups 30 ensure that contact with the surface 18 occurs before the seal element 22 contacts the surface 18 and the second is that because of the thin cross section of the backups near the terminal ends 32, the backups are capable of seating against inconsistencies in surface 18. This is particularly beneficial in as-rolled casing, for example, to reduce the possibility of extrusion. The thinner and therefore pliable terminal ends 32 and proximate portions of the backups 30 deform easily into abnormalities of the surface 18.

Turning to the seal element 22, the same comprises, in various embodiments, one or more of a relatively large number of materials such as Fluoro elastomers (FKM), Perfluoro elastomers (FFKM), Hydrogenated Nitrile Butadiene Rubber (HNBR), Nitrile Butadiene Rubber (NBR), Polytetrafluoroethylene, Polyetheretherketone, or other relatively soft material including soft metals such as lead, gold, silver, bronze, copper, etc.

It will be appreciated from FIG. 1 that one end 36 of the seal element 22 is configured to closely follow a contour of the recess 20 whereas the other end 38 of the seal element 22 does not closely follow the contour of the recess 20. Rather, the configuration of end 38 specifically does not follow the contour of the recess proximate thereto. This provides for additional energization of the seal element 22 during and after the setting process. More specifically the configuration as illustrated allows for fluid pressure, which bypasses the backups 30, to act on end 38 as soon as the seal element 22 contacts surface 18, that is, when a surface 40 of seal element 22 communicates sufficiently with surface 18 to allow a pressure differential across the sealing member 10 to exist. The pressure that then acts upon end 38, causes axial compression upon the seal element 22, energizing the seal element in a similar manner to that of a compression set packer.

Still referring to FIG. 1, it is to be appreciated that the surface 40 includes a step 42 at one end thereof. The step, in an embodiment such as illustrated in FIG. 1, will always be at an end of the seal element that comes into contact with the surface 18 last. It will be appreciated that a seal member such as that illustrated is moved axially as it is expanded. The axial movement up the frustocone naturally causes the leading end of the seal element to contact the surface 18 first and begin to drag thereon. Because of the drag, it is possible in prior art devices for the element to extrude over the backups 30 and thereby defeat its purpose. In the invention, the configuration of the seal element 22 is such that drag on the seal surface 40 is insufficient to cause material of element 22 building up enough to crest the backups 30 at end 36 of the member 10. Rather, the backups 30 at the trailing end of the member 10, which in the illustrated embodiment of FIG. 1 is at end 36 of the element 22 will contact and conform to the surface 18 before the element 22 can drag over the backups 30. The step 42 then is of significant benefit to the art in that it appreciably enhances the ratio of elements set properly to those not set properly.

Figure 2:
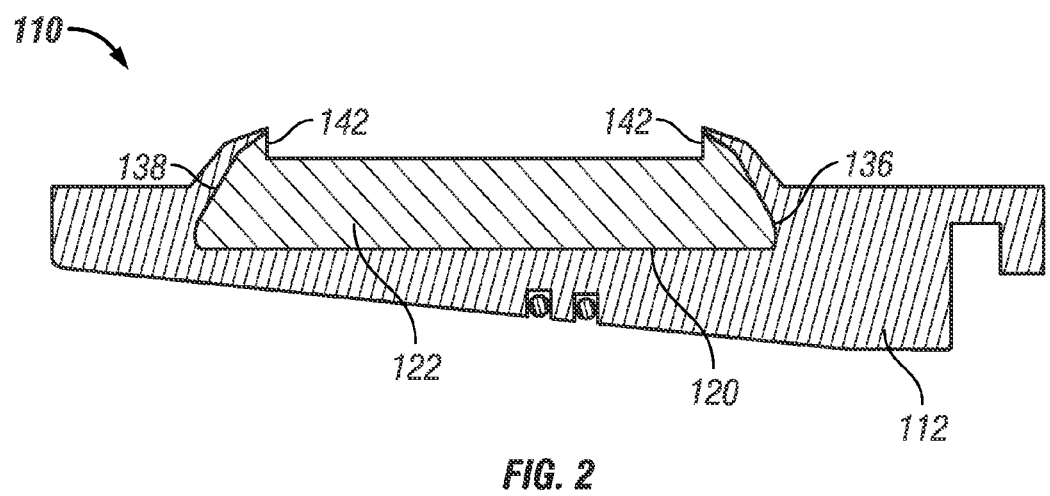
FIG. 2 is a cross sectional representation of a portion of an alternate embodiment sealing configuration.

Referring now to FIG. 2, wherein similar or identical components are numbered using 100 series numbers of those used in connection with the FIG. 1 embodiment, an alternate embodiment of a sealing member 110 is illustrated. In this embodiment, there are two distinctions over the prior described embodiment of FIG. 1. These are: a step 142 on both ends of the element 122, and that the element 122 closely follows the contour of the recess 120 on both ends 136 and 138 of the element 122. This embodiment allows for simpler construction of the member 110 as the element 122 does not have a particular orientation for assembly with the body 112. Rather the element 122 is symmetrical and can be assembled to the body 112 in either direction.

It is to be noted that in either disclosed embodiment, a bonding agent may be used to secure the element 22 or 122 to the body 12 or 112. The bonding agent may be placed at an end of the element that closely contours to the recess whether that be at one end (FIG. 1) or at both ends (FIG. 2). It is also possible in some embodiments to bond between the ends 36/38, 136/138.

Additionally, in view of thermal expansion of materials, it is desirable in some embodiments to configure the seal element 22, 122 to have a resting inside dimension that is smaller than a resting outside dimension of the body 12, 112. This will facilitate maintenance of a sealing interface between the element and the body during exposure to temperatures sufficiently high to cause expansion of the seal element 22, 122.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A sealing member configured to be radially outwardly urged into sealing engagement with a surface radially outwardly positioned of the sealing comprising:
a body having tapered radially inwardly positioned surface configured to interact with a seperate frustoconical member in or to, in use, radially outwardly urge the body, and the body having a radially outwardly positioned recess opening radially outwardly;
one or more backups extending radially outwardly from the body and tapering over a length thereof; the backups each extending at an angle to the body other than orthogonally, at least one of the one or more backups including an internal surface having a first section extending radially outwardly of the body at the first angle and the second section extending from the first section at a second angle, the first section extending into the recess and the second section extending further into the recess; and
a sealing element disposed in the recess.

2. A sealing member as claimed in claim 1 wherein one or more of the one of more backups includes more than one angle over its length.

3. A sealing member as claimed in claim 2 wherein a differential in the angles is in the range of about 5 to about 25 degrees.

4. A sealing member as claimed in claim 1 wherein the taper is sufficient to allow the backups to follow deviations in the target sealing surface of about 0.05 to about 0.1 inch.

5. A sealing member as claimed in claim 1 wherein the sealing element is configured to conform to the recess at one end and conform to the recess at an opposite end thereof to a lesser degree in comparison to the one end.

6. A sealing member as claimed in claim 1 wherein the sealing element is configured to be exposed to pressure differential at one of two ends thereof resulting in energization of the sealing element when exposed to differential pressure.

7. A sealing member as claimed in claim 1 wherein the sealing element comprises a high temperature material.

8. A sealing member as claimed in claim 1 wherein the sealing element is bonded to the body at least at a portion of where the sealing element is confomant to the recess.

9. A sealing member as claimed in claim 1 wherein the sealing element is bonded to the body at least one backup.

10. A sealing member as claimed in claim 1 wherein the sealing element is symmetrical about an axial center thereof.

11. A sealing member as claimed in claim 1 wherein the sealing element at rest possesses an inside dimension smaller than an outside dimension of the body at the recess when at rest.

12. A sealing member as claimed in claim 1 wherein the sealing member is a high temperature/high pressure seal.

* * * * *